US012756066B2

(12) United States Patent
La et al.

(10) Patent No.: US 12,756,066 B2
(45) Date of Patent: Oct. 6, 2026

(54) SOLVENT FREE SEPARATORS

(71) Applicant: AMTEK RESEARCH INTERNATIONAL LLC, Lebanon, OR (US)

(72) Inventors: Chi Thuong-Le La, Happy Valley, OR (US); Jeff M. Frenzel, Albany, OR (US); Don Spitz, Albany, OR (US); Kaylee Duchateau, Lebanon, OR (US); Richard W. Pekala, Corvallis, OR (US); Matthew Alan Warren, Salem, OR (US)

(73) Assignee: AMTEK RESEARCH INTERNATIONAL LLC, Lebanon, OR (US)

( * ) Notice: Subject to any disclaimer, the term of this patent is extended or adjusted under 35 U.S.C. 154(b) by 547 days.

(21) Appl. No.: 18/250,491

(22) PCT Filed: Nov. 11, 2021

(86) PCT No.: PCT/US2021/072364
§ 371 (c)(1),
(2) Date: Apr. 25, 2023

(87) PCT Pub. No.: WO2022/104361
PCT Pub. Date: May 19, 2022

(65) Prior Publication Data

US 2023/0395937 A1 Dec. 7, 2023

Related U.S. Application Data

(60) Provisional application No. 63/112,629, filed on Nov. 11, 2020, provisional application No. 63/112,628, filed on Nov. 11, 2020.

(51) Int. Cl.
*H01M 50/491* (2021.01)
*H01M 50/403* (2021.01)
(Continued)

(52) U.S. Cl.
CPC ....... *H01M 50/446* (2021.01); *H01M 50/403* (2021.01); *H01M 50/417* (2021.01); *H01M 50/463* (2021.01); *H01M 50/491* (2021.01)

(58) Field of Classification Search
CPC ............. H01M 50/491; H01M 50/489; H01M 50/494; H01M 50/497
See application file for complete search history.

(56) References Cited

U.S. PATENT DOCUMENTS

| | | | |
|---|---|---|---|
| 8,795,565 | B2 | 8/2014 | Wei et al. |
| 2005/0003151 | A1 | 1/2005 | Jacoby |

(Continued)

FOREIGN PATENT DOCUMENTS

| | | | |
|---|---|---|---|
| CN | 1173425 | A | 2/1998 |
| CN | 101245150 | A | 8/2008 |

(Continued)

OTHER PUBLICATIONS

International Search Report and Written Opinion dated Feb. 9, 2022 received in international patent application No. PCT/US2021/072364.

(Continued)

*Primary Examiner* — Kendra Ly
(74) *Attorney, Agent, or Firm* — Dorsey & Whitney LLP

(57) ABSTRACT

This disclosure relates to battery separators for use in lead acid batteries. In particular, the disclosure relates to nonporous polymer sheets in which the porosity manifests itself after cavitation and/or biaxial stretching to form a microporous membrane. The disclosure also relates to nonporous polymer sheets in which the porosity manifests itself after dissolution of an acid soluble filler to form a microporous membrane. In addition to meeting all battery performance requirements, these microporous membranes eliminate envi- (Continued)

ronmental and health concerns because they do not require the use of an organic solvent during their production.

20 Claims, 11 Drawing Sheets

(51) Int. Cl.

*H01M 50/417* (2021.01)
*H01M 50/446* (2021.01)
*H01M 50/463* (2021.01)

(56) References Cited

U.S. PATENT DOCUMENTS

| | | | |
|---|---|---|---|
| 2009/0123828 A1 | 5/2009 | Kono et al. | |
| 2009/0258212 A1 | 10/2009 | Jacoby | |
| 2012/0145468 A1 | 6/2012 | Pekala et al. | |
| 2012/0329894 A1 | 12/2012 | Yamamoto et al. | |
| 2018/0065105 A1* | 3/2018 | Song | B01D 69/1214 |

FOREIGN PATENT DOCUMENTS

| | | | |
|---|---|---|---|
| CN | 101245150 B | 9/2010 |
| CN | 102892534 A | 1/2013 |
| CN | 103493252 A | 1/2014 |
| CN | 103988336 A | 8/2014 |
| CN | 105637116 A | 6/2016 |
| CN | 106738793 A | 5/2017 |
| CN | 107362693 A | 11/2017 |
| EP | 0865914 A1 | 9/1998 |
| EP | 1757653 A1 | 2/2007 |
| EP | 2444453 A1 | 4/2012 |
| JP | 2015229688 A | 12/2015 |
| JP | 2017513996 A | 6/2017 |
| KR | 20200012918 A | 2/2020 |
| WO | 2007046226 A1 | 4/2007 |
| WO | 2011112885 A1 | 9/2011 |
| WO | 2013090380 A1 | 6/2013 |

OTHER PUBLICATIONS

Espinal Laura: "Porosity and Its Measurement" In: "Characterization of Materials", Oct. 12, 2012, John Wiley & Sons, Inc., XP055951251, ISBN: 978-0-471-26696-9.

* cited by examiner

SOLVENT FREE SEPARATORS

RELATED APPLICATIONS

This patent application is a U.S. National Stage filing under 35 U.S.C. 371 of International Patent Application No. PCT/2021/072364, entitled SOLVENT FREE SEPARATORS, filed on Nov. 11, 2021, which claims priority to U.S. Provisional Application No. 63/112,629, filed Nov. 11, 2020, titled SOLVENT FREE SEPARATORS, and U.S. Provisional Application No. 63/112,628, filed Nov. 11, 2020, titled SOLVENT FREE SEPARATORS, each of which is incorporated herein by reference in its entirety.

COPYRIGHT NOTICE

© 2021 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to battery separators for use in lead acid batteries. In particular, one embodiment of the disclosure relates to nonporous polymer sheets in which the porosity manifests itself after cavitation and/or biaxial stretching to form a microporous membrane. Another embodiment of the disclosure relates to nonporous polymer sheets in which the porosity manifests itself after dissolution of an acid soluble filler to form a microporous membrane. In addition to meeting all battery performance requirements, these microporous membranes eliminate environmental and health concerns because they do not require the use of an organic solvent during their production.

BACKGROUND OF THE INVENTION

The recombinant cell and the flooded cell are two different types of commercially available lead acid battery designs. Both types include adjacent positive and negative electrodes that are separated from each other by a porous battery separator. The porous separator prevents the adjacent electrodes from coming into physical contact and provides space for an electrolyte to reside. Such separators are formed of materials that are sufficiently porous to permit the electrolyte to reside in the pores of the separator material, thereby permitting ionic current flow between adjacent positive and negative plates.

One type of recombinant battery, a VRLA (valve regulated lead-acid) battery, typically includes an absorptive glass mat (AGM) separator composed of microglass fibers. While AGM separators provide high porosity (>90%), low electrical resistance, and uniform electrolyte distribution, they are relatively expensive and still do not offer precise control over oxygen transport rate or the recombination process. Furthermore, AGM separators exhibit low puncture resistance that is problematic for two reasons: (1) the incidence of short circuits increases, and (2) manufacturing costs are increased because of the fragility of the AGM sheets. In some cases, battery manufacturers select thicker, more expensive separators to improve the puncture resistance, while recognizing that the electrical resistance increases with thickness.

In the second type of lead acid battery, the flooded cell battery, only a small portion of the electrolyte is absorbed into the separator. Flooded cell battery separators typically include porous derivatives of cellulose, polyvinyl chloride, organic rubber, and polyolefins. More specifically, microporous polyethylene separators are commonly used because of their ultrafine pore size, which inhibits dendritic growth while providing low electrical resistance, high puncture strength, good oxidation resistance, and excellent flexibility. These properties facilitate sealing of the battery separator into a pocket or envelope configuration in which a positive or negative electrode can be inserted.

More recently, enhanced flooded batteries (EFB) have been developed to meet the high cycling requirements in "start-stop" or "micro-hybrid" vehicle applications. In such applications, the engine is shut off while the car is stopped (e.g., at a traffic light) and then re-started afterwards. The advantage of a "start-stop" vehicle design is that it results in reduced $CO_2$ emissions and better overall fuel efficiency. A major challenge in "start-stop" vehicles is that the battery must continue to supply all electrical functions during the stopped phase while being able to supply sufficient current to re-start the engine at the required moment. In such cases, the battery must exhibit higher performance with respect to cycling and recharge capability as compared to a traditional flooded Pb-acid battery design.

Most flooded lead acid batteries include polyethylene separators. The term "polyethylene separator" is a misnomer because these microporous separators require large amounts of precipitated silica to be sufficiently acid wettable. The volume fraction of precipitated silica and its distribution in the separator generally controls its electrical properties, while the volume fraction and orientation of polyethylene in the separator generally controls its mechanical properties. The porosity range for commercial polyethylene separators is generally 50-65%.

During the manufacture of polyethylene separators, precipitated silica is typically combined with a polyolefin, a process oil, and various minor ingredients to form a separator mixture that is extruded at elevated temperature through a sheet die to form an oil-filled sheet. As used herein, the term sheet can also be referred to as a film, web, or membrane. The oil-filled sheet is calendered to its desired thickness and profile, and the majority of the process oil is extracted with an organic solvent. Hexane and trichloroethylene have been the two most common solvents used in separator manufacturing. The solvent-laden sheet is then dried to form a microporous polyolefin separator (otherwise known as a microporous sheet, film, web, or membrane) and is slit into an appropriate width for a specific battery design.

The polyethylene separator is delivered in roll form to lead acid battery manufacturers where the separator is fed to a machine that forms "envelopes" by cutting the separator material and sealing its edges such that an electrode can be inserted to form an electrode package. The electrode packages are stacked such that the separator acts as a physical spacer and an electronic insulator between positive and negative electrodes. An electrolyte is then introduced into the assembled battery to facilitate ionic conduction within the battery.

The primary purposes of the polyolefin contained in the separator are to (1) provide mechanical integrity to the polymer matrix so that the separator can be enveloped at high speeds and (2) to prevent grid wire puncture during battery assembly or operation. Thus, the hydrophobic polyolefin can have a molecular weight that provides sufficient molecular chain entanglement to form a microporous web or membrane with high puncture resistance. The primary purpose of the hydrophilic silica is to increase the acid wettability of the separator web or membrane, thereby lowering the electrical resistivity of the separator. In the absence of silica, the sulfuric acid would not wet the hydrophobic web or membrane and ion transport would not occur, resulting in an inoperative battery. Consequently, the silica component of the separator typically accounts for between about 55% and about 80% by weight of the separator, i.e., the separator has a silica-to-polyethylene weight ratio of between about 1.8:1 and about 3.5:1.

In response to ongoing environmental pressures and health concerns related to organic solvents such as hexane and trichloroethylene, there is a need for new approaches for the manufacture of microporous membranes that can meet the performance and process requirements for production of a Pb-acid battery separator.

SUMMARY OF THE INVENTION

In one embodiment, an object of the present disclosure is to produce a nonporous polymer sheet in which the porosity manifests itself after cavitation and/or biaxial stretching to form a microporous membrane that can be utilized as a Pb-acid battery separator. One particular embodiment that has been demonstrated is extrusion of a nonporous, isotactic polypropylene (i-PP) film with or without a silica filler that can be subsequently stretched in the machine direction and/or cross (or transverse) machine direction to form a microporous membrane.

In another embodiment, an object of the present disclosure is to produce a nonporous polymer sheet in which the porosity manifests itself after dissolution of an acid soluble filler to in-situ form a microporous membrane that can be utilized as a Pb-acid battery separator. One particular embodiment that has been demonstrated is extrusion of a nonporous, polyethylene film containing sodium sulfate which dissolves to form pores when exposed to sulfuric acid during battery formation (also referred to herein as extruded, filled films). These and other embodiments are further detailed below.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
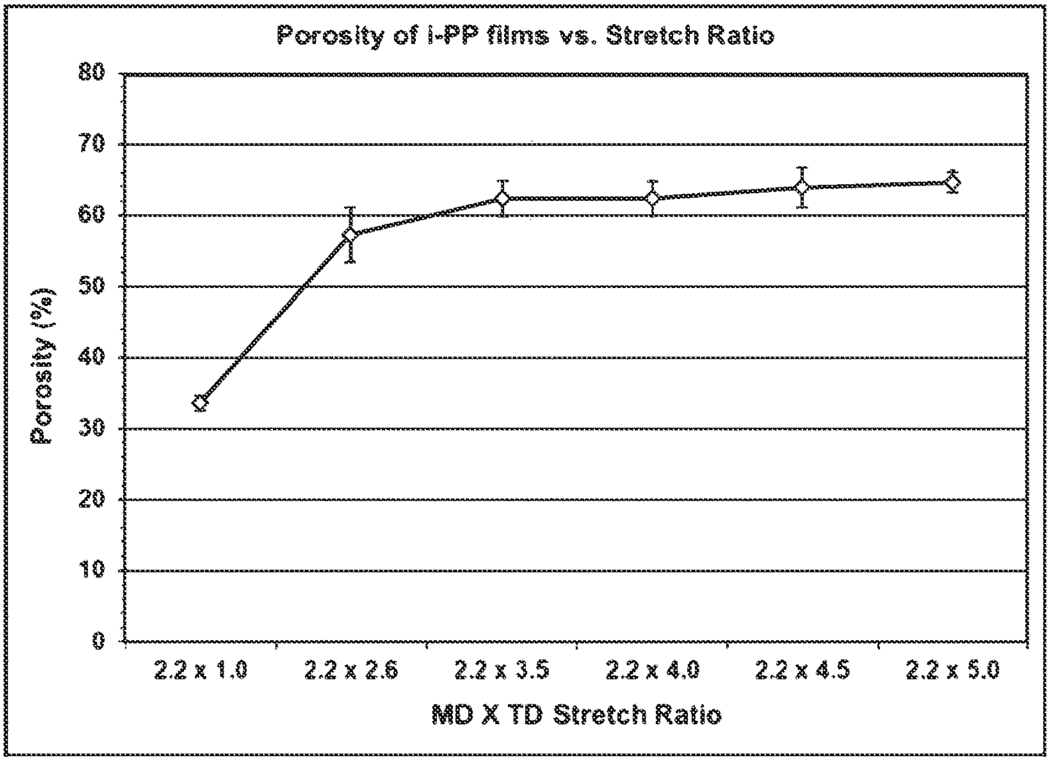
FIG. 1 is a graph demonstrating the porosity achieved in i-PP membranes using different biaxial stretch conditions.

In an ideal scenario, battery manufacturers would like to use their existing capital equipment and manufacturing process with any new separator that is developed for Pb-acid batteries. Such a “drop in” replacement must meet the following requirements: i) be delivered in roll form; ii) have the ability to be manufactured in multiple profiles (rib height, rib spacing, backweb thickness); iii) be easy to cut and edge seal to form a separator pocket in which an electrode can be inserted; iv) result in a battery with expected performance and life characteristics; and v) be cost competitive. New approaches to forming battery separators are detailed below.

Porosity via Mono-Axial or Biaxial Stretching

One new approach to separators has been identified to meet the above criteria without going through a solvent extraction step. Polypropylene is extruded in combination with one or more of a nucleating agent, silica, a plasticizer or process oil, and a surfactant to form a nonporous sheet that is wound into rolls. It will be appreciated that a “sheet” can also be referred to as a film, web, or membrane as desired. The sheet can then be stretched mono-axially or biaxially (either sequentially or simultaneously) to form a porous membrane as a result of cavitation and/or beta-crystal to alpha-crystal transformation.

Polypropylene is available in 3 different stereoregular configurations—atactic, isotactic, and syndiotactic. Isotactic grade polypropylene (i-PP) most commonly contains alpha-crystals that melt near 165 C, but metastable beta-crystals with a melting point near 150 C can be formed with the addition of select nucleating agents to an i-PP melt. Beta-crystals can also be formed by shear-induced crystallization from the melt, or by quenching the melt to a certain temperature between 100-130° C. Nevertheless, a nucleating agent is a convenient and reliable way to produce polypropylene films with high beta-crystal content on a commercial basis.

Upon stretching, beta-crystals are converted to alpha-crystals that form pores or micro-voids during the process due to changes in specific volume of the crystals. During this transition, the i-PP films change from hazy to white, indicative of light scattering from the pores/voids that have been formed. If an inorganic filler such as calcium carbonate or silica is present, additional porosity can result from cavitation.

In some embodiments, the polypropylene used is i-PP. Stated another way, in certain embodiments, the grade of polypropylene contains at least 30 wt % i-PP (including at least 40 wt %, at least 50 wt %, at least 60 wt %, at least 70 wt %, at least 80 wt %, at least 90 wt %, at least 95 wt %, and at least 99 wt % i-PP). Blends of other polymers with i-PP are possible, such as a blend of i-PP with polyethylene (PE). In a particular embodiment, a blend of i-PP with high and low molecular weight PE and PP copolymers (e.g., block or random) can be used.

Various grades of i-PP can be used. For instance, the i-PP can have a melt flow index of 0.5 to 10. In contrast, the ultrahigh molecular weight polyethylene used in many conventional lead acid separators effectively has a melt flow index of 0.

As set forth above, the nonporous sheet and the final microporous membrane can include a combination of i-PP (or a blend thereof) with one or more of a nucleating agent, silica, a plasticizer or process oil, and a surfactant. In both the nonporous sheet and the final microporous membrane, the i-PP can be 60-80 wt % of the sheet or membrane. Specifically, the i-PP can be 65-75 wt % of the sheet or membrane, and even more specifically, 68-73 wt % of the sheet or membrane.

When a nucleating agent is used to induce beta-crystals in the i-PP, the nucleating agent can be any beta-nucleating agent known in the art, such as quinacridone dye (known as "red E3B"), aluminum salt of 6-quinazirin sulfonic acid, disodium salt o-phthalic acid, sophthalic and terephthalic acids, N—N'-dicyclohexyl 2-6-naphthalene dicarboximide (known as "NJ Star NU-100"), a blend of organic dibasic acid plus oxide, hydroxide, or acid of a Group II metal (e.g., Mg, Ca, St, Ba, etc.), and proprietary β nucleating agents sold by the Mayzo Corp. of Norcross, GA (provided as a masterbatch). In some embodiments, the nucleating agent is present in sufficient quantity to provide a high beta-crystal content in the i-PP, pre-stretching (i.e., in the nonporous sheet). For example, the nucleating agent can be present from 0.2 to 4 wt %, such as 1 to 3 wt %. The quantity of nucleating agent needed can be experimentally determined.

In some embodiments, the beta-nucleating agent is present when a plasticizer or process oil, surfactant, and/or inorganic filler are present. The presence of a plasticizer or process oil, surfactant, and/or inorganic filler (while aiding to porosity in later processing steps) tends to inhibit beta-crystal formation during manufacture of the nonporous film. Without wishing to be bound by theory, it is believed the beta-nucleating agent enhances the beta-crystal content, despite the presence of a plasticizer or process oil, surfactant, and/or inorganic filler. Accordingly, it is surprising that the formulations disclosed herein can be stretched to provide high porosity membranes. Again, without wishing to be bound by theory, it is believed the combinations disclosed herein may in fact balance the beta-crystal enhancing properties of the beta-nucleating agent, with the beta-crystal to alpha-crystal transition enhancing properties of the plasticizer or process oil, surfactant, and/or inorganic filler.

"High beta-crystal content" refers to a beta-crystal K value of at least 0.4. In certain embodiments, the K value is 0.5 or higher (including 0.6 or higher and 0.8 or higher). The K value of the i-PP film can be determined by methods known in the art, such as wide-angle X-ray diffraction or differential scanning calorimetry. The K value represents the percent beta-crystals relative to the total crystallinity of the material. For example, a K value of zero means only alpha crystals are present. A K value of one means 100% beta crystals are present. It should be understood that it can be desirable to have high beta-crystal content in the nonporous sheet, but once the sheet is stretched, the beta-crystals (or at least a substantial amount) will be converted to alpha crystals, resulting in a microporous membrane.

An inorganic filler can be present from about 5-25 wt % (in both the nonporous and microporous films). In some embodiments, the inorganic filler is present from about 5-20 wt %. Without limitation, the inorganic filler provides the double benefit of aiding pore formation in the nonporous sheet during stretching (via cavitation) and aiding the wettability of the final microporous sheet in sulfuric acid. Non-limiting examples of inorganic fillers include an inorganic oxide, carbonate, or hydroxide, such as, for example, alumina, silica, zirconia, titania, mica, boehmite, magnesium hydroxide, calcium carbonate, and mixtures thereof. In one embodiment the inorganic filler is silica, particularly precipitated silica. Fumed silica can also be used. Notably, the inorganic filler to i-PP ratio is much lower than a similar ratio in a conventional polyethylene-based lead-acid separator. Less inorganic filler will generally be present than i-PP. For example, the ratio of inorganic filler to i-PP can be from about 1:16 to about 1:3. In another embodiment, the ratio of inorganic filler to i-PP is from about 1:13 to about 1:7. The inorganic filler will typically not be present in a large enough quantity to provide complete wettability for the microporous i-PP film in sulfuric acid. A surfactant or wetting agent will typically be required to achieve sufficient wettability.

Additionally, an acid soluble sacrificial pore former can optionally be present, such as sodium sulfate. The sacrificial pore former would dissolve in acid, such as an acidic electrolyte like sulfuric acid, and increase the porosity of the separator in-situ.

A plasticizer or process oil can be present from 0-20 wt % (in both the nonporous sheet and microporous membrane). In some embodiments, the plasticizer or process oil is present from 5-15 wt %. The plasticizer or process oil may aid in the transition of the beta crystals to alpha crystals during stretching and thereby aid in the overall porosity of the final microporous membrane. A variety of plasticizers or process oils can be used, such as, for example, paraffinic, naphthenic, vegetable oil, plant-based oils, and mixtures thereof. Notably, the plasticizer or process oil is not extracted from the nonporous sheet during formation of the microporous membrane. The plasticizer or process oil may also aid in oxidation resistance of the microporous membrane.

The surfactant or wetting agent can be present from 2-20 wt % in both the nonporous sheet and microporous membrane. In some embodiments, the surfactant is present from 2-15 wt % in the sheet or membrane. As with the plasticizer or process oil, the surfactant aids in the transition of the beta crystals to alpha crystals during stretching and thereby aids in the overall porosity of the final microporous membrane. Also like the plasticizer or process oil, the surfactant is not extracted from the nonporous sheet during formation of the microporous membrane. The surfactant can be extruded with the i-PP and is anchored to the i-PP to aid in providing instantaneous and sustained wettability to the microporous membrane in sulfuric acid. The surfactant can also function as a plasticizer.

The surfactant can be an anionic surfactant, such as a class of anionic surfactants known as linear alkylbenzene sulfonates or the class of surfactants known as alkyl sulfosuccinates, such as either of which with an alkyl moiety of minimum alkyl chain length of C8, or in which the alkyl moiety has an alkyl chain length from about C10 to about C16 (e.g., sodium dodecylbenzene sulfonate or sodium sulfosuccinate).

The surfactant can have a hydrophobic tail component, such as selected from a group including block copolymers of polyethylene glycol and polypropylene glycol, block copolymers of polyethylene oxide and polypropylene oxide, alkyl ether carboxylates, sulfates of fatty acid alcohols, and phosphate esters.

The extruded nonporous sheet containing high beta-crystal content i-PP (such as at least partially caused by beta-nucleating agent), inorganic filler, plasticizer or process oil, and/or surfactant is formed at a thickness nearly twice or more the desired thickness of the final microporous membrane. For example, the final microporous membrane can have a thickness of 0.05 mm to 0.25 mm, 0.10 mm to 0.20 mm, or 0.15 mm to 0.20 mm. The thickness of the microporous membrane that does not include the height of any ribs or surface protrusions. For such final microporous membranes, the nonporous sheet will need to have a thickness of greater than 0.10 mm, such as from about 0.10 mm to about 0.50 mm. To provide uniform porosity throughout the thickness of the final microporous membrane, it is important to have uniform high beta-crystal content throughout the thickness of the nonporous sheet.

The extruded nonporous sheet containing high beta-crystal content i-PP (such as at least partially caused by beta-nucleating agent), inorganic filler, plasticizer or process oil, and/or surfactant can be extruded as a sheet and not as a tube. The extruded nonporous sheet can then be biaxially stretched. Because of the high degree of biaxial orientation, the microporous membranes exhibit outstanding puncture strength compared to conventional PE/$SiO_2$-based, Pb-acid separators. This attribute also provides the opportunity to manufacture i-PP separators with thinner backwebs than conventional PE/$SiO_2$ separators while maintaining equivalent puncture strength. Such thinner i-PP separators would also result in lower electrical resistance thereby benefiting battery performance.

In some embodiments, the microporous membranes have a porosity of about 50 to about 70%, such as between about 55 to about 65%. In certain embodiments, the microporous membranes have a porosity of great than about 50%, or greater than about 60%.

The microporous membranes have a stretch ratio of at least 2.0 in either the machine direction, transverse direction, or both. In certain embodiments, the microporous membranes have a stretch ratio of at least 2.0 in both directions. Even more specifically, the transverse direction stretch ratio can be at least 3.0, at least 4.0, or at least 5.0.

In some embodiments, the microporous membranes have a tortuosity of about 1.5 and about 3, or between about 2.0 and about 2.5. The electrical resistivity of the microporous membranes can also be less than about 10,000 mΩ-cm, less than 9,000 mΩ-cm, or less than about 8,000 mΩ-cm. In other embodiments, the electrical resistivity of the microporous membranes can be between about 2,500 mΩ-cm and about 6,000 mΩ-cm, or between about 3,500 mΩ-cm and about 4,000 mΩ-cm.

Figure 19:
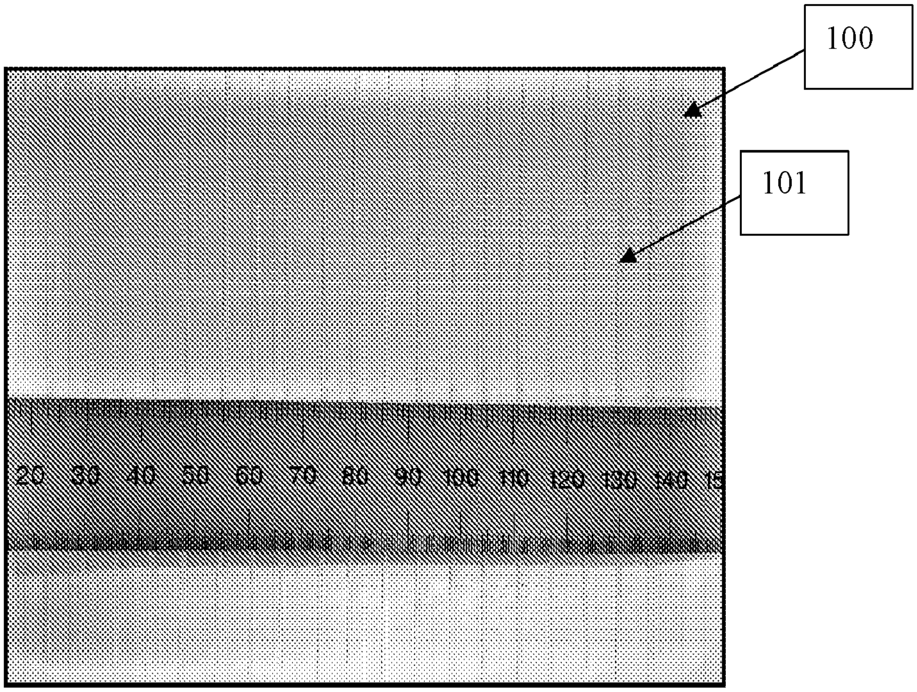
FIG. 19 is a plan view of a membrane having a plurality of ribs disposed thereon.

Exemplary microporous membranes are detailed below. As can be appreciated, the microporous membranes can be processed and/or used as battery separators. For instance, a plurality of ribs can be formed into the structure of the microporous membranes. For example, the nonporous sheets can be extruded with ribs, but the shape and pattern must be chosen to account for the subsequent stretching that is imparted to the sheet during formation of the microporous membrane. Alternatively, ribs, dots, or other surface protrusions can be extruded or otherwise formed individually, after which they can be added or deposited on the microporous membrane in a downstream process after the i-PP sheet or membrane is biaxially oriented. An exemplary microporous membrane 100 having a plurality of ribs 101 is shown in FIG. 19 (which also depicts a ruler for relative size comparison). The ribs can be continuous or discontinuous and/or various shapes and/or sizes. The ribs or surface protrusions can include various polyolefin materials. The ribs or surface protrusions can also be various heights, such as between about 0.4 mm and about 1.4 mm. Such ribs or surface protrusions can aid in controlling the spacing between adjacent electrodes. Spacing can also be provided via use of a scrim, mesh, or other perforated material in conjunction with the i-PP membrane.

The microporous membranes can also be cut and sealed to form a separator pocket in which an electrode can be inserted.

Porosity Via Acid Soluble Fillers

Another new approach to separators has been identified to meet the above criteria without going through a solvent extraction step. A very high molecular weight high density polyethylene (VHMW-HDPE) is extruded in combination with an acid-soluble filler, plasticizer or process oil, and a surfactant to form a nonporous sheet (extruded, filled sheet) which subsequently becomes porous (ionically conductive) upon exposure to sulfuric acid inside the battery case. In this approach, it is also possible to first increase porosity of the sheet via cavitation in which the polymer "de-bonds" from the surface of the filler during mono-axial or biaxial orientation. This product is referred to herein as a "cavitated, filled sheet." The additional porosity can help to accelerate the dissolution of the filler upon sulfuric acid exposure. Accordingly, the separator can be supplied to a battery manufacturer as either an extruded, filled sheet or as a cavitated, filled sheet. Either way, during battery manufacture, in the presence of electrolyte (such as sulfuric acid), the acid-soluble filler dissolves and the pores in the polymer become filled with electrolyte, rendering the sheet or membrane ionically conductive, and wetted by the electrolyte.

Ultrahigh molecular weight polyethylene (UHMWPE) is an unusual polymer in that it exhibits no flow even when heated above its melting point of 135 C. This phenomenon results from extremely long polymer chains and their high degree of entanglement. This is also why UHMWPE must be combined with a large percentage of plasticizer or process oil in order to be extruded into a sheet (or film) or fiber. In order to then form a microporous Pb-acid separator or a high tensile strength fiber, the plasticizer or process oil must be extracted from the extrudate using an organic solvent as previously discussed.

Figure 12:
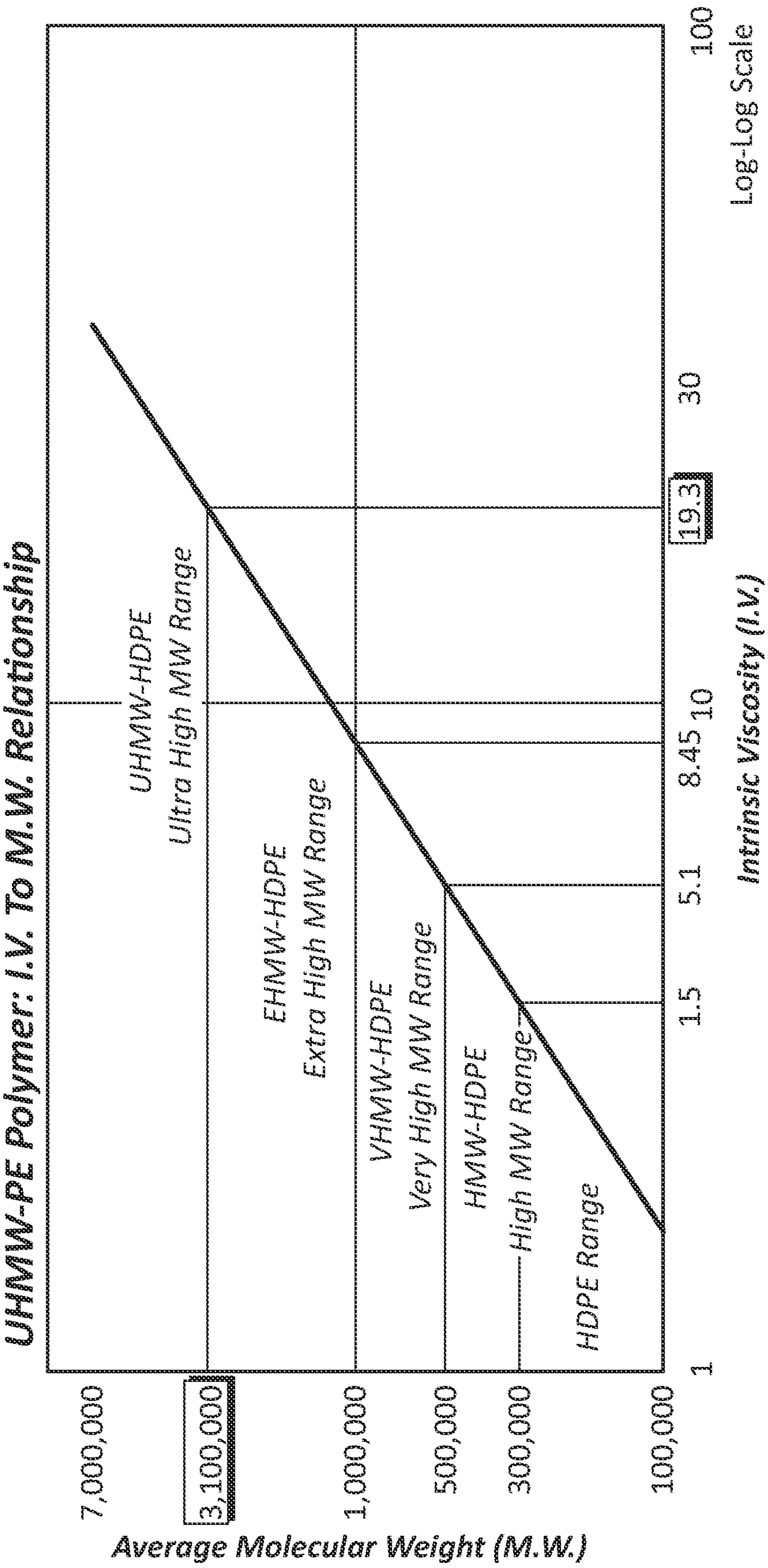
FIG. 12 is a graph showing the molecular weight range for various types of polyethylene.

While UHMWPE is defined as having a molecular weight greater than 3.1 million g/mol, there are other grades of polyethylene that have slightly lower molecular weight and are melt-processable. FIG. 12 shows the molecular weight range for various types of polyethylene.

In this approach to solvent free separators, various melt processable grades of polyethylene can be combined with one or more of an acid-soluble filler, plasticizer or process oil, and a surfactant to form a nonporous sheet which subsequently becomes porous upon exposure to sulfuric acid inside the battery case. Polyethylene grades having molecular weight between 500,000-2 million g/mol were tested. Sodium sulfate was the filler of choice since it is already purposefully dissolved in the sulfuric acid used by many Pb-acid battery manufacturers. Sodium sulfate was milled to a mean particle size of 3.1 um, 4.4 um, and 10 um in order to study the effect of particle loading on packing.

The polyethylene can have an average molecular weight of 500,000-2 million g/mol. In the nonporous sheet, the PE can be 10-30 wt % of the sheet. In some embodiments, the PE is 10-20 wt % of the sheet, such as 10-15 wt %.

In some embodiments, sodium sulfate is used as the acid-soluble filler. Without being limited thereby, other possible acid-soluble fillers include the following cations: lithium, sodium, potassium, magnesium, calcium, zinc, aluminum, and tin; and the following anions: metaborate, carbonate, bi-carbonate, hydroxide, oxide, and sulfate. The acid soluble filler can be present from 25-75 wt %. The acid electrolyte in lead-acid batteries is aqueous and varies in concentration depending on the state of charge of the battery, age of the battery, etc. As used herein, "acid soluble" refers to solubility in the range of aqueous solutions commonly found in the electrolyte of lead acid batteries.

The plasticizer or process oil can be present from 0-20 wt % (in both the nonporous sheet and microporous membrane). In some embodiments, the plasticizer or process oil is present from 5-15 wt %. A variety of plasticizers or process oils can be used, such as, for example, paraffinic, naphthenic, and mixtures thereof. Notably, the plasticizer or process oil is not extracted from the nonporous sheet during formation of the microporous membrane. The plasticizer or process oil can provide oxidation resistance to the PE membrane and can extend the life of the battery separator in sulfuric acid.

The surfactant or wetting agent can be present from 2-20 wt % (in both the nonporous sheet and microporous membrane). In some embodiments, the surfactant is present from 2-15 wt % in the sheet or membrane. Alternatively, the weight ratio of surfactant to PE can be 0.3:1 to 1:1. Like the plasticizer or process oil, the surfactant is not extracted from the nonporous sheet during formation of the microporous membrane. The surfactant can be extruded with the PE and is anchored to the PE to aid in providing instantaneous and sustained wettability to the microporous membrane in sulfuric acid. The surfactant can also function as a plasticizer.

The surfactant can be an anionic surfactant, such as a class of anionic surfactants known as linear alkylbenzene sulfonates or the class of surfactants known as alkyl sulfosuccinates, such as either of which with an alkyl moiety of minimum alkyl chain length of C8, or in which the alkyl moiety has an alkyl chain length from about C10 to about C16 (e.g., sodium dodecylbenzene sulfonate or sodium sulfosuccinate).

The surfactant can have a hydrophobic tail component, such as selected from a group including block copolymers of polyethylene glycol and polypropylene glycol, block copolymers of polyethylene oxide and polypropylene oxide, alkyl ether carboxylates, sulfates of fatty acid alcohols, and phosphate esters.

In addition to an acid-soluble filler, an inorganic filler that is largely insoluble in acid can be present from 0-25 wt % in both the nonporous sheet and microporous membrane. The acid-insoluble inorganic filler provides the double benefit of aiding pore formation in the nonporous sheet during stretching (via cavitation) and aiding the wettability of the final microporous membrane in sulfuric acid. Non-limiting examples of inorganic fillers include alumina, silica, zirconia, titania, mica, boehmite, and mixtures thereof. In one embodiment, the inorganic filler is silica, particularly precipitated silica. Fumed silicas can also be used. Notably, the inorganic filler to PE ratio is much lower than a similar ratio in a conventional polyethylene-based lead-acid separator.

The extruded, nonporous sheet (also referred to herein as the extruded, filled sheet) can be further processed a number of ways. The extruded, filled sheet can be rolled as a finished product and shipped to a battery manufacturer. The battery manufacturer can use the extruded, filled sheet directly in enveloping processes. An electrode can be inserted in the resulting envelope, the battery fabricated, and filled with acid electrolyte (e.g., sulfuric acid). A benefit of the present technology is that ionic conductivity of the separator is generated in-situ during formation of the battery.

The separator can be tailored (via acid-soluble filler content, surfactant content, and stretching) to release all or less than all of the acid-soluble filler during the formation step. In the case of "two-shot" formation, the separator can be tailored to release nearly all of the acid-soluble filler during the "first shot" and then release the remaining portion during the "second shot." For example, some battery manufacturers prefer to have 2-25 g/L of sodium sulfate in the battery electrolyte. In such situations, regardless of whether battery formation is "two shot" or "single shot," the separator can be tailored to release the desired sodium sulfate into the electrolyte. For example, for a battery with 1.5 $m^2$ of separator and 4 liters of electrolyte, the separator can be tailored to have 5-67 g/m 2 of sodium sulfate in the separator to release the desired quantity into the electrolyte.

As discussed more below, to aid in the rapid release of the acid soluble filler, the extruded, filled sheet can be stretched monoaxially or biaxially (simultaneously or sequentially) to aid in release of the acid soluble filler. Additionally, by virtue of cavitation, the porosity of the membrane can be enhanced by stretching, before in-situ pore generation occurs. Post stretching, the cavitated, filled sheet can have 10% porosity or more. However, with sufficient stretching, the cavitated, filled sheet can have higher porosity before in-situ pore generation has even occurred. The cavitated, filled sheet can be used in the battery manufacturing steps discussed above, instead of the extruded, filled sheet.

Exemplary membranes are detailed below. As can be appreciated, the membranes can be processed and/or used as battery separators. For instance, ribs can be formed into the structure of the membranes. The membranes can also be cut and sealed to form a separator pocket in which an electrode can be inserted.

The following examples are illustrative in nature and not intended to be limited in any way.

Example 1

In order to use i-PP for Pb-acid separators, the following technical hurdles had to be overcome: i) formation of thick i-PP membranes (>0.25 mm) with high beta-crystal content; ii) creation of 55-65% porosity after cavitation and/or stretching; and iii) excellent wettability with sulfuric acid.

In order to achieve the above characteristics, the following exemplary and non-limiting formulation was investigated: 68% i-PP; 10% naphthenic process oil; 10% fumed silica; 10% surfactant; and 2% nucleating agent. The particular formulation is detailed in Table I:

TABLE I

| Raw Material | Supplier | Units | Formulation |
|---|---|---|---|
| i-PP, S801 | KPIC | g/hr | 2040 |
| Silica, Aerosil 200 | Evonik | g/hr | 300 |
| β-nucleating agent, MPM 1113 | Mayzo | g/hr | 60 |
| Surfactant (or wetting agent), Igepal NP-13 | Solvay | g/hr | 300 |
| Process oil (plasticizer), Hydrocal 800 | Calumet | g/hr | 300 |

In forming a nonporous sheet, the i-PP, silica, and β-nucleating agent were fed to a 27-mm co-rotating twin-screw extruder operating at a melt temperature of approximately 180 C. The surfactant and process oil were pre-mixed together using a propeller-type mixer, and fed in-line at the first oil-injection port of the extruder. The resulting extrudate was passed through a sheet die onto an anneal roll to form a nonporous sheet having a thickness of about 0.50 mm. The thickness of the sheet was controlled by adjusting the gap of the die lip and the speed of the anneal roll. The desired annealing temperature of the sheet (121 C) was achieved by controlling the temperature of the anneal roll. The annealing time (100 sec.) of the sheet was obtained by adjusting the speed of the anneal roll. The annealed sheet was slit to 285 mm, and wound on a cardboard core for subsequent biaxial orientation.

Various microporous membranes were formed by stretching the nonporous sheet in the machine direction (MD) and transverse direction (TD) using Machine Direction Orientation and Tenter Frame equipment available from Parkinson Technologies, Inc. The nonporous sheet was stretched at 85 C in the MD, and 130 C in the TD. The resulting microporous membranes were tested for thickness and porosity, which are shown in Table II.

TABLE II

| | Stretch Ratio | | Thickness | Bulk Density | Porosity |
|---|---|---|---|---|---|
| Sample # | MD | TD | (mm) | (g/cc) | (%) |
| 1 | 2.2 | 1.0 | 0.29 | 0.67 | 34 |
| 2 | 2.2 | 2.6 | 0.18 | 0.43 | 57 |
| 3 | 2.2 | 3.5 | 0.15 | 0.38 | 62 |
| 4 | 2.2 | 4.0 | 0.14 | 0.38 | 62 |
| 5 | 2.2 | 4.5 | 0.12 | 0.36 | 64 |
| 6 | 2.2 | 5.0 | 0.13 | 0.35 | 65 |

Figure 2:
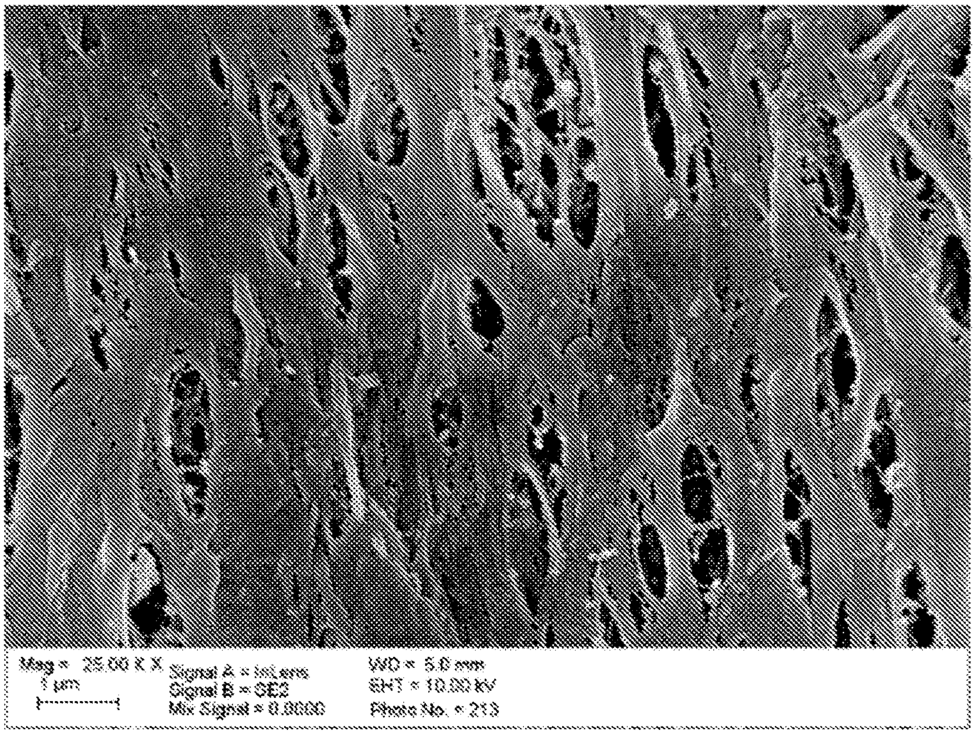
FIG. 2 is an SEM showing the pore structure and morphology at the surface of an i-PP membrane.
Figure 3:
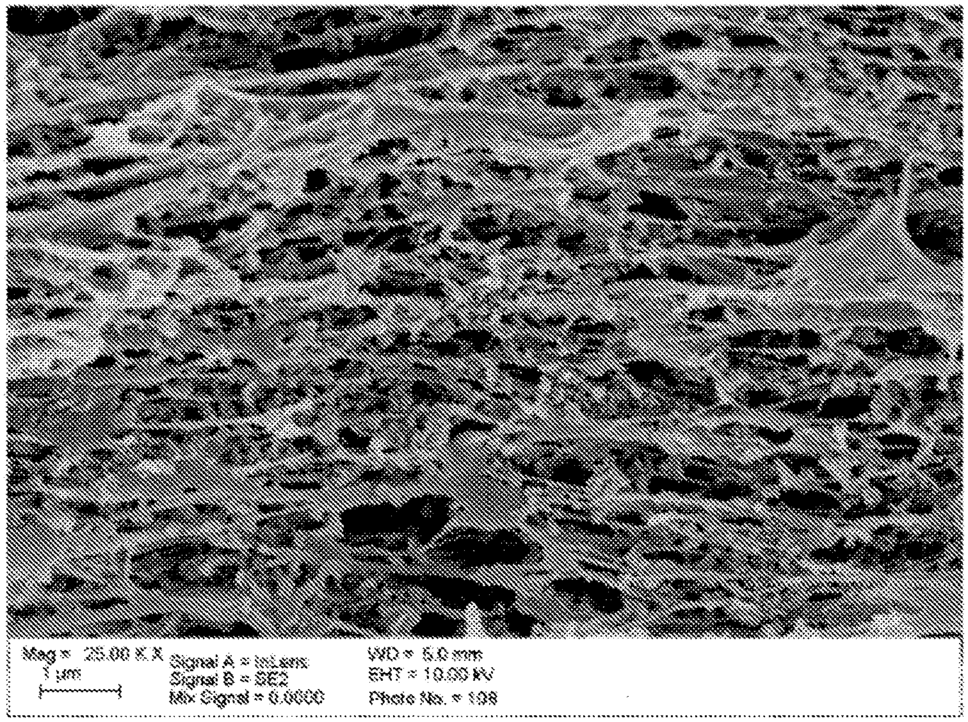
FIG. 3 is a freeze fracture SEM showing the pore structure and morphology through a cross-section of an i-PP membrane.

The range of porosity achieved in the i-PP membranes using different biaxial stretch conditions is further exemplified in FIG. 1. FIG. 2 shows a scanning electron micrograph of the pore structure and morphology at the surface of an i-PP membrane. FIG. 3 shows a freeze fracture SEM showing pore structure and morphology through a cross-section of an i-PP membrane.

In general, others have had difficulty achieving even thin i-PP membranes with porosity in the same range as conventional PE/$SiO_2$-based, lead-acid separators (55-65%). However, FIG. 1 shows that higher porosity has been achieved in a thick i-PP membrane after biaxial stretching conditions. Although the porosity is partially impacted by a reduction in beta-crystals that results from the presence of the naphthenic process oil and surfactant in the formulations, extrusion conditions and formulations aided in achieving >60% porosity.

The naphthenic process oil is helpful to impart good oxidation resistance to the i-PP separator while the surfactant helps ensure that all available porosity can be wet out with sulfuric acid.

Finally, it is possible to extrude nonporous, i-PP sheets with ribs, but the shape and pattern must be chosen to account for the subsequent stretching that is imparted to the membrane for separator production. Alternatively, ribs can be added in a downstream process after the i-PP sheet or membrane is biaxially oriented.

Example 2

Various microporous membranes containing isotactic polypropylene (i-PP) were prepared from the formulations listed in Table III.

TABLE III

| Sample # | i-PP Grade | MFI (g/10 min) | Silica (wt %) | Surfactant (wt %) | Process Oil (wt %) | Nucleating agent (wt %) |
|---|---|---|---|---|---|---|
| 1 | KPIC S800 (73%) | 0.8 | Aerosil 200 (10%) | Tegmer 812 (5%) | HC-800 (10%) | MPM 1113 (2%) |
| 2 | KPIC S802M (73%) | 1.8 | Aerosil 200 (10%) | Tegmer 812 (5%) | HC-800 (10%) | MPM 1113 (2%) |
| 3 | KPIC S801 (73%) | 3.1 | Aerosil 200 (10%) | NP-13 (5%) | HC-800 (10%) | MPM 1113 (2%) |
| 4 | KPIC S801 (73%) | 3.1 | Aerosil 200 (10%) | Tegmer 812 (5%) | HC-800 (10%) | MPM 1113 (2%) |
| 5 | Braskem PG80Q (73%) | 8.0 | Aerosil 200 (10%) | Tegmer 812 (5%) | HC-800 (10%) | MPM 1113 (2%) |
| 6 | Braskem FF030F2 (73%) | 3.0 | Aerosil 200 (10%) | Tegmer 812 (5%) | HC-800 (10%) | MPM 1113 (2%) |
| 7 | Braskem FF030F2 (73%) | 3.0 | Aerosil 200 (10%) | NP-13 (5%) | HC-800 (10%) | MPM 1113 (2%) |
| 8 | Braskem Inspire 6025 (73%) | 2.5 | Aerosil 200 (10%) | Tegmer 812 (5%) | HC-800 (10%) | MPM 1113 (2%) |
| 9 | Braskem Inspire 6025 (68%) | 2.5 | Aerosil 200 (10%) | Tegmer 812 (5%) | HC-800 (15%) | MPM 1113 (2%) |
| 10 | Braskem Inspire 6025 (70%) | 2.5 | BL6030 (13%) | Tegmer 812 (5%) | HC-800 (10%) | MPM 1113 (2%) |

Aerosil 200 - fumed silica
BL6030 - precipitated silica
Tegmer 812 - glycol ester surfactant or wetting agent
NP-13 - nonylphenol ethoxylate nonionic surfactant or wetting agent
HC-800 - process oil (plasticizer)
MPM 1113 - beta nucleating agent Extruded sheets containing the above-identified formulations were formed and then stretched in the machine direction, followed by the transverse direction, to achieve a stretch ratio of 3.5 MD, 3.5 TD. Properties of the biaxially stretched microporous membranes were then measured.

The puncture resistance (which can also be referred to as puncture strength) of the samples was measured in accordance with the procedures set forth in the Battery Council International (BCI) Battery Technical Manual (2017-2022

Figure 4:
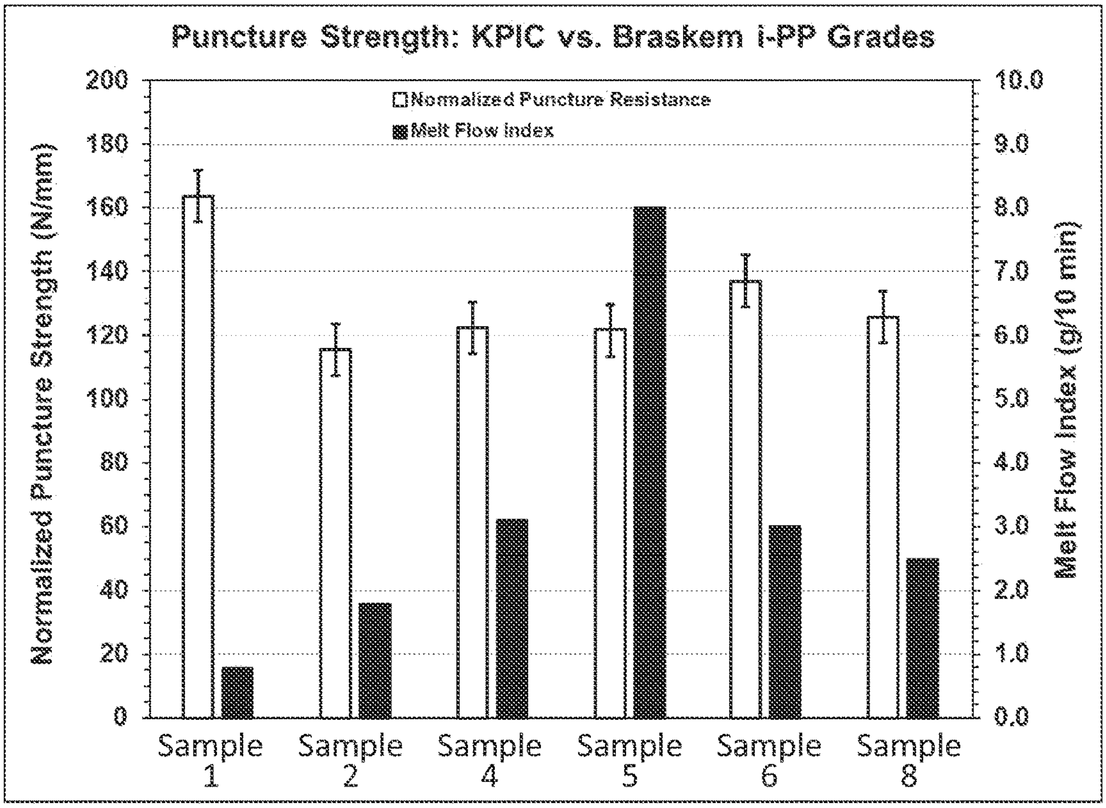
FIG. 4 is graph comparing normalized puncture resistance (N/mm) to melt flow indices of various i-PP grades used to manufacture membranes.
Figure 5:
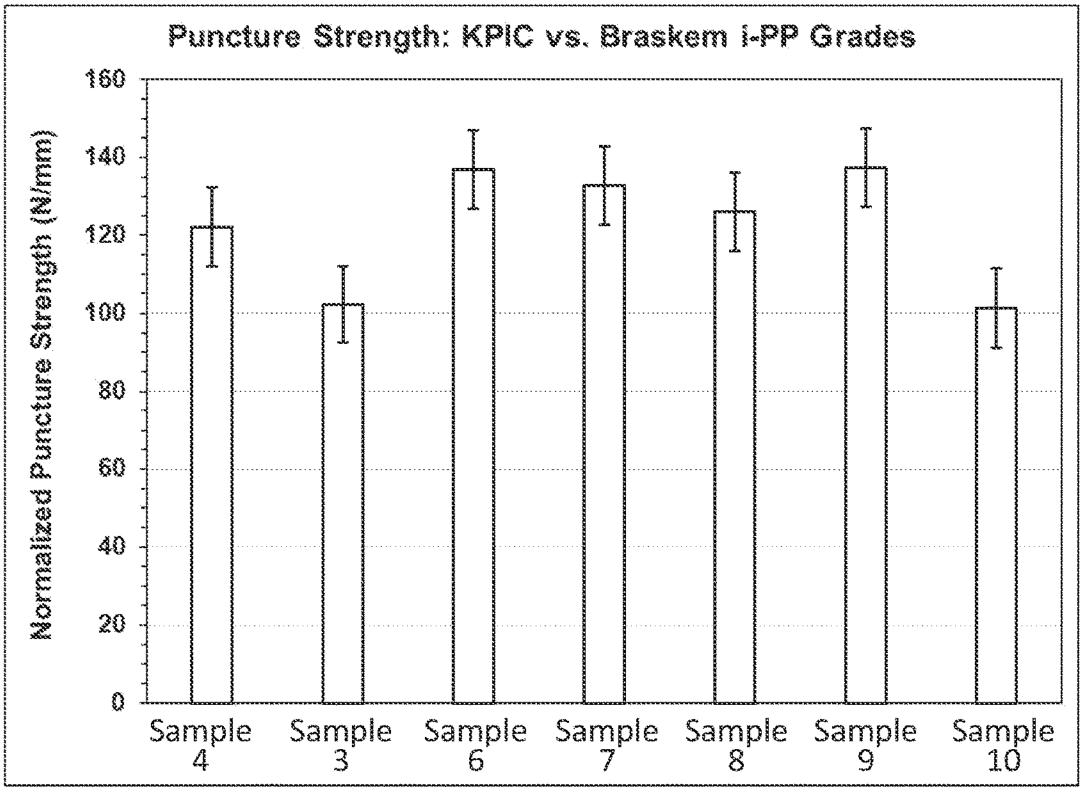
FIG. 5 is another graph showing normalized puncture resistance (N/mm) of various i-PP membranes.

Revision), the results of which are depicted in FIGS. 4 and 5. FIG. 4 compares normalized puncture resistance (N/mm) to the melt flow indices (MFI) of various i-PP grades used to manufacture membranes. As shown in FIG. 4, Sample 1 had the lowest MFI (0.8) and the highest puncture resistance. The puncture resistance of the remaining membranes was not significantly impacted by the change in i-PP grade or MFI.

FIG. 5 demonstrates normalized puncture resistance vs. types of silica, types of surfactant, and concentration of process oil. As shown in FIG. 5, increasing the concentration of processing oil did not significantly impact the puncture performance (see e.g., Sample 8 and Sample 9). Replacing fumed silica with precipitated silica lowered puncture performance (see e.g., Sample 8 and Sample 10). The puncture resistance was also observed to be greater than 100 N/mm for each of the samples, which is significantly higher than standard PE/$SiO_2$-based, lead-acid separators (which typically achieve 40 N/mm-60 N/mm).

Figure 6:
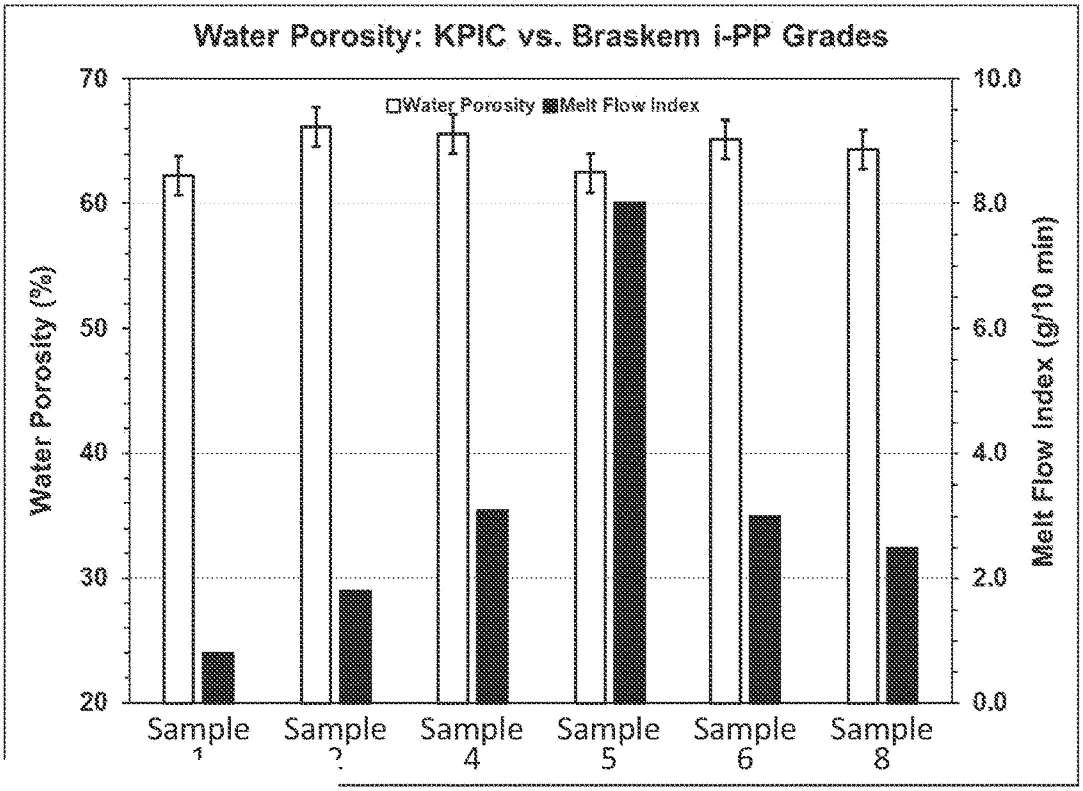
FIG. 6 is a graph comparing water porosity to melt flow indices of various i-PP grades used to manufacture membranes.
Figure 7:
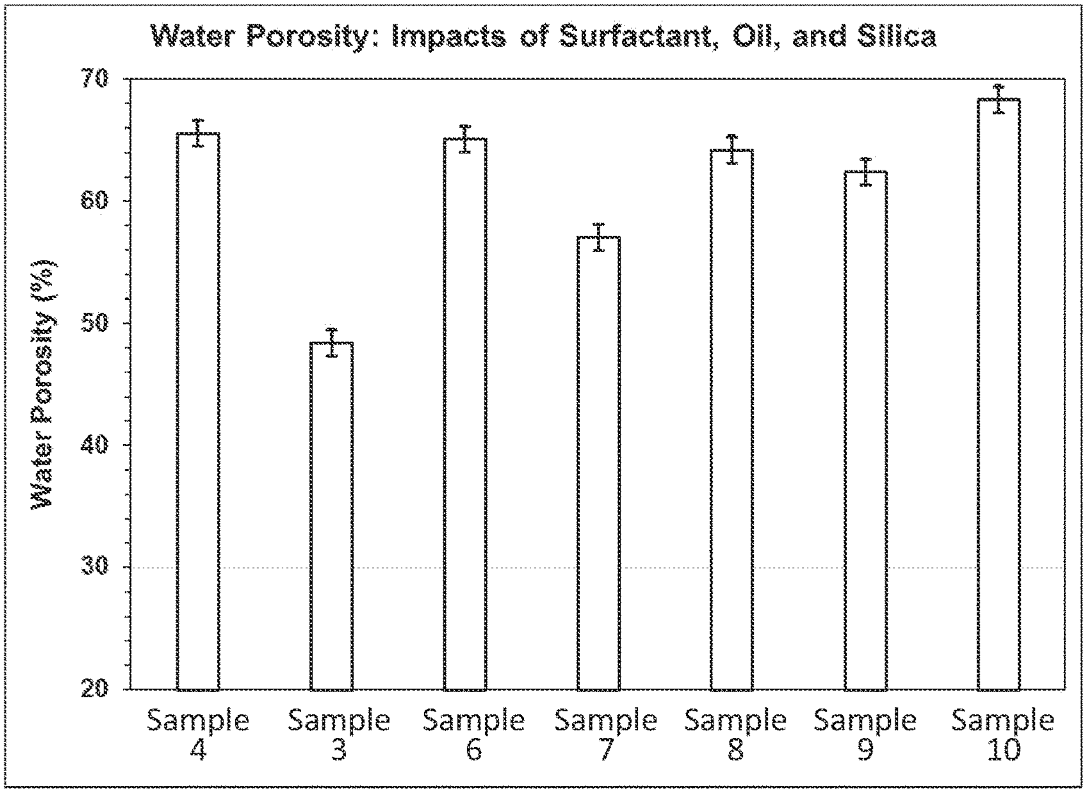
FIG. 7 is another graph showing water porosity of various i-PP membranes.

The water porosity was measured for the samples, the results of which are depicted in FIGS. 6 and 7. Water porosity was determined as follows: a sample of the microporous membrane was wetted in de-ionized water under vacuum for 15 minutes. After measuring volume and wetted mass, the wetted sample was dried in a convection oven at 110° C. for 20 minutes, and the dried mass was taken. Water porosity was then calculated as: Water porosity=(wet mass−dried mass)/wet volume, where the density of de-ionized water was 1 g/cc at room temperature.

FIG. 6 compares water porosity to the melt flow indices of various i-PP grades used to manufacture membranes. As shown in FIG. 6, the water porosity ranged from 60% to 70%, and more specifically, from 63% to 66% for each of the samples. As further shown in FIG. 6, the water porosity was not significantly impacted by the change in i-PP grade or MFI.

FIG. 7 demonstrates water porosity vs. types of silica, types of surfactant, and concentrations of process oil. As shown in FIG. 7, changing surfactants can impact the water porosity as samples containing NP-13 had a lower porosity than samples containing Tegmer 812 (see e.g., Samples 3 and 7 as compared to Samples 4, 6, 8, 9, and 10). Varying the concentration of process oil from 10% to 15% did not significantly change the water porosity (see e.g., Sample 8 and Sample 9).

Figure 8:
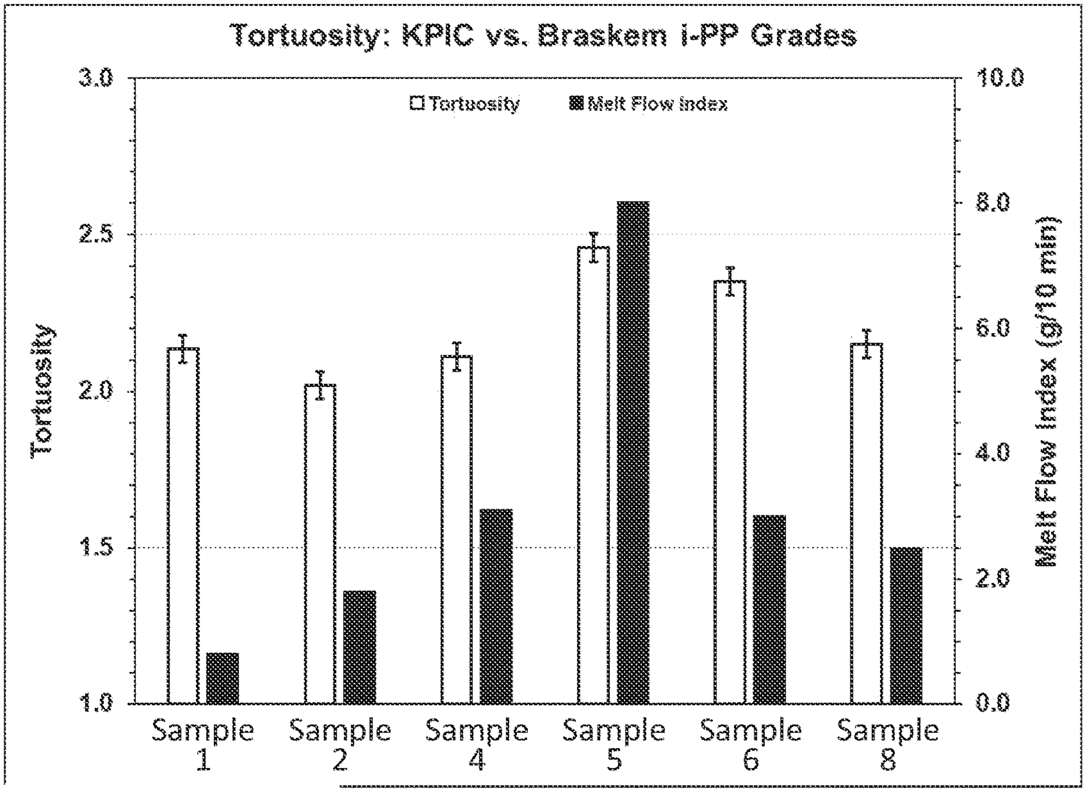
FIG. 8 is a graph comparing tortuosity to melt flow indices of various i-PP grades used to manufacture membranes.
Figure 9:
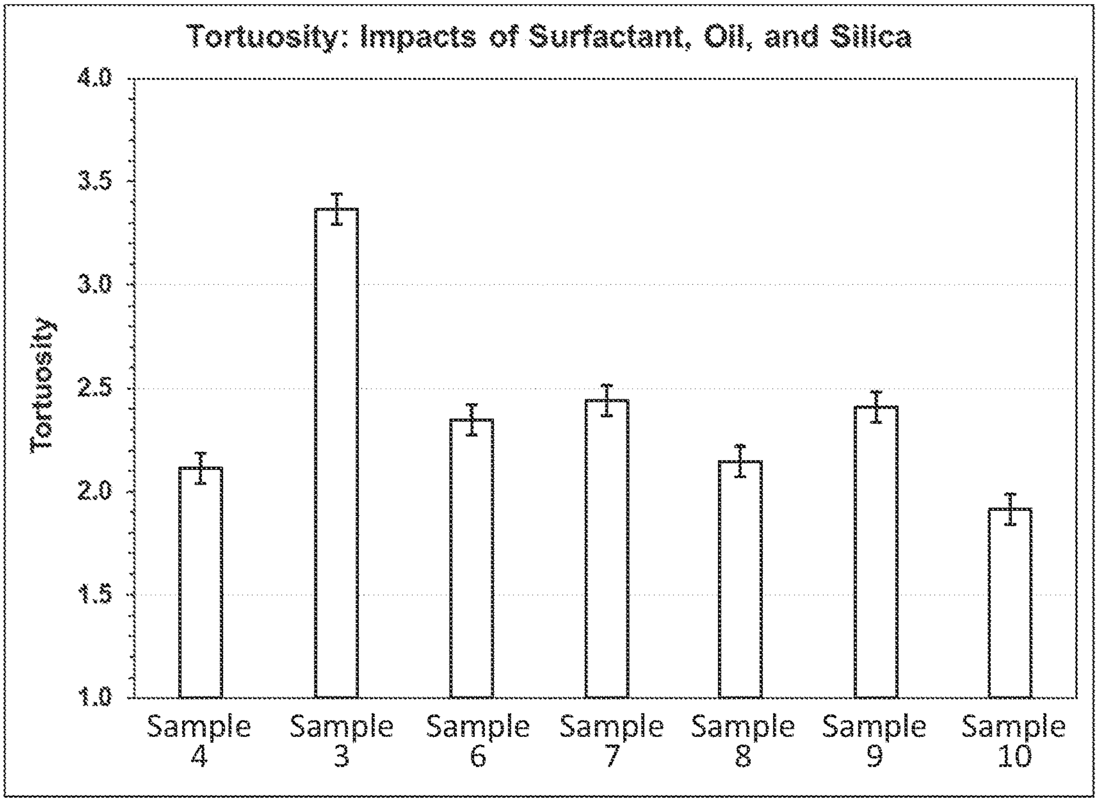
FIG. 9 is another graph showing tortuosity of various i-PP membranes.

The tortuosity was measured, the results of which are depicted in FIGS. 8 and 9. Tortuosity of the microporous membrane was determined based on diffusion of a solute from an aqueous solution of known concentration through the wetted membrane, into water. In the example herein, the aqueous solution contained potassium chloride, KCl, as the solute at a concentration of 1.0M. The microporous membranes were previously wetted in de-ionized water under vacuum for 15 minutes, and sandwiched between two compartments, one compartment (feed compartment) contained a known volume of the potassium chloride solution, the other compartment (diffusate compartment) contained de-ionized water in the same volume. Concentration of potassium chloride in the diffusate compartment was measured over time. The following relationship was used to calculate diffusional resistance, $R_d$, of the microporous membranes:

$$\ln\left[\frac{C_0 - 2C_d(t)}{C_0}\right] = -\frac{2A}{VR_d} \times t$$

where $C_0$ is the initial concentration in the feed compartment, $C_d(t)$ is concentration of KCl in the diffusate compartment at time t, A is the membrane area exposed to the solutions, V is volume of solution in one compartment, and $R_d$ is diffusional resistance of the membrane.

Plotting the left-hand side of the above equation against time yields a straight line whose slope equals $$-\frac{2A}{VR_d} \times t$$

Tortuosity is related to diffusional resistance from the following equation:

$$R_d = \frac{l \times \tau^2}{D \times \varepsilon}$$

where l is membrane thickness, τ is tortuosity, D is diffusivity of solute, and ε is membrane's porosity.

FIG. 8 compares tortuosity to the melt flow indices of various i-PP grades used to manufacture membranes. FIG. 9 demonstrates tortuosity vs. types of silica, types of surfactant, and concentration of process oil. As shown in FIGS. 8 and 9, the tortuosity for each of the samples was between about 1.5 and about 3.5.

Figure 10:
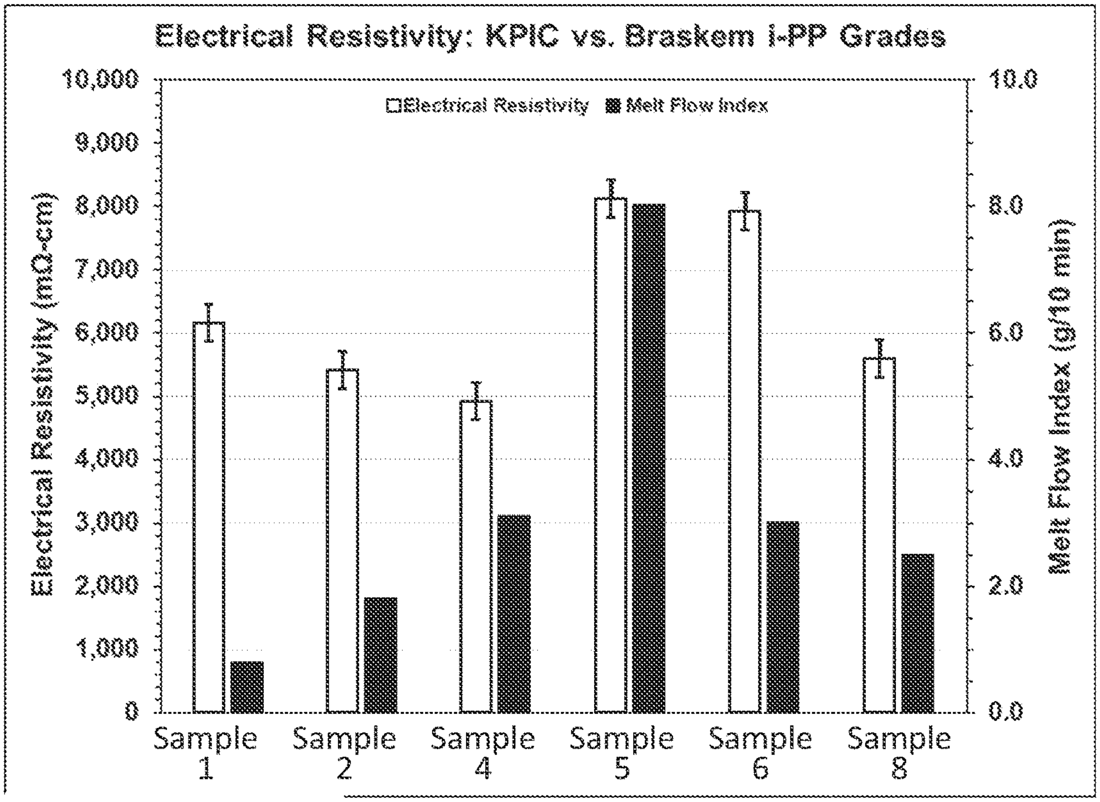
FIG. 10 is a graph comparing electrical resistivity to melt flow indices of various i-PP grades used to manufacture membranes.
Figure 11:
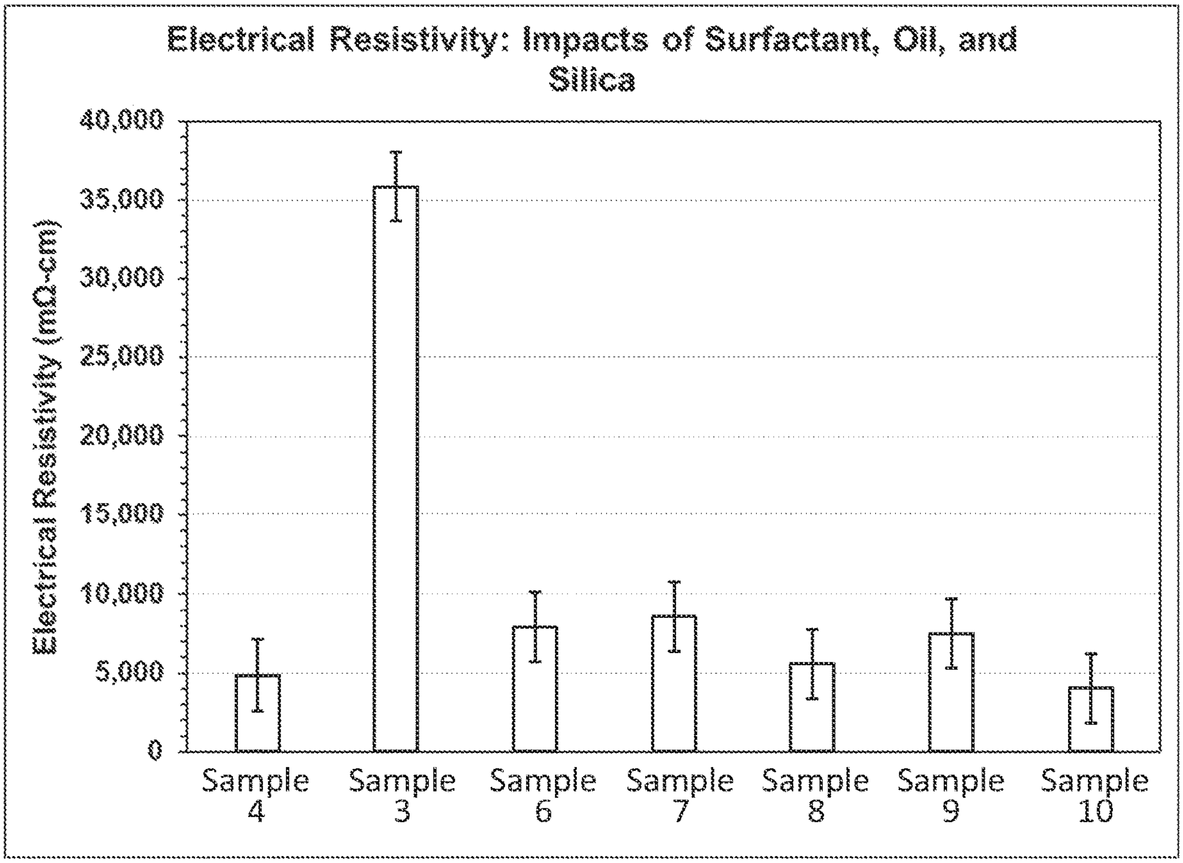
FIG. 11 is another graph showing electrical resistivity of various i-PP membranes.

The electrical resistivity was also measured in accordance with the 10 min boil, 20 min soak procedure set forth in the Battery Council International (BCI) Battery Technical Manual (2017-2022 Revision), the results of which are depicted in FIGS. 10 and 11. FIG. 10 compares electrical resistivity to the melt flow indices of various i-PP grades used to manufacture membranes. FIG. 11 demonstrates tortuosity vs. types of silica, types of surfactant, and concentration of process oil. As shown in FIGS. 10 and 11, the electrical resistivity for most of the samples was less than 10,000 mΩ-cm, and more specifically less that about 9,000 mΩ-cm.

Example 3

The following formulations were investigated: about 14% polyethylene; about 13% naphthenic process oil; 58-65% sodium sulfate; 0-7% precipitated silica; and about 8% surfactant (or wetting agent). The particular formulations are detailed in Table IV:

TABLE IV

| | | | Formulation | | |
|---|---|---|---|---|---|
| Raw Material | Supplier | Units | A | B | C |
| VHMWPE, GHR 8110 (polyethylene) | Celanese | g | 409.3 | | |
| UH650 (polyethylene) | Asahi | g | | 409.3 | 409.3 |
| Sodium Sulfate | Hammond | g | 1950 | 1950 | 1755 |
| Silica, BL 2230 | OSC | g | | | 195 |
| Oil, ENTEK 800 | Calumet | g | 393 | 393 | 393 |
| Wetting agent, Rhodaspec DS-10 | Solvay | g | 245.6 | 245.6 | 245.6 |
| Lubricant, Ca/Zn stearate | Ferro | g | 2 | 2 | 2 |

For each formulation, dry ingredients were combined in a LittleFord W-10 mixer and blended at low agitation speed of approximately 600 rpm for about 2 minutes. Next, 200 g of process oil was added separately in a paint pot, pressurized to approximately 45 psi, and sprayed onto the blended dry ingredients. The agitation speed of the mixer was then increased to 1200 rpm. Mixing was carried out for 2 more minutes to form a homogeneous mix. This mix was then fed to a 27-mm co-rotating twin-screw extruder operating at a melt temperature of approximately 210 C. The remaining process oil in the formulation was added in-line at the first oil-injection port of the extruder. The resulting melt was passed through a sheet die into a calender. A sheet thickness in the range between 0.25 mm to 0.35 mm was obtained by adjusting the gap at the die lip. The extruded sheet was slit to 120-125 mm width and wound onto cardboard cores for subsequent testing.

Figure 13:
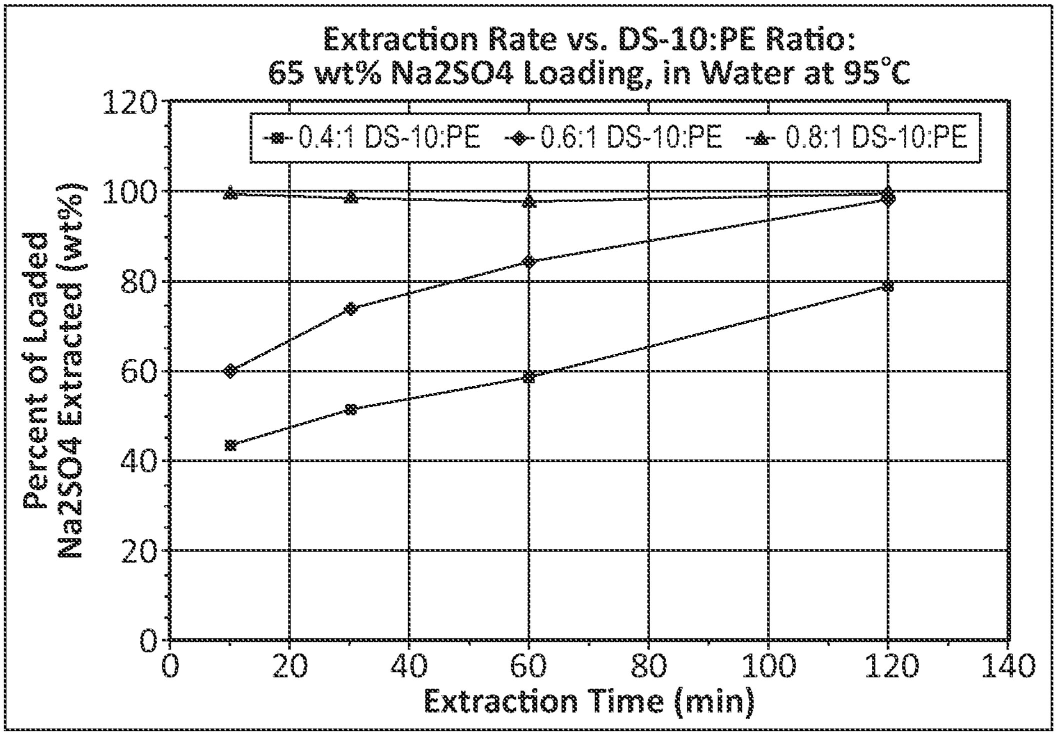
FIG. 13 is a graph showing the time required to leach sodium sulfate from nonporous $Na_2SO_4$/PE sheets as a function of surfactant loading level.
Figure 14:
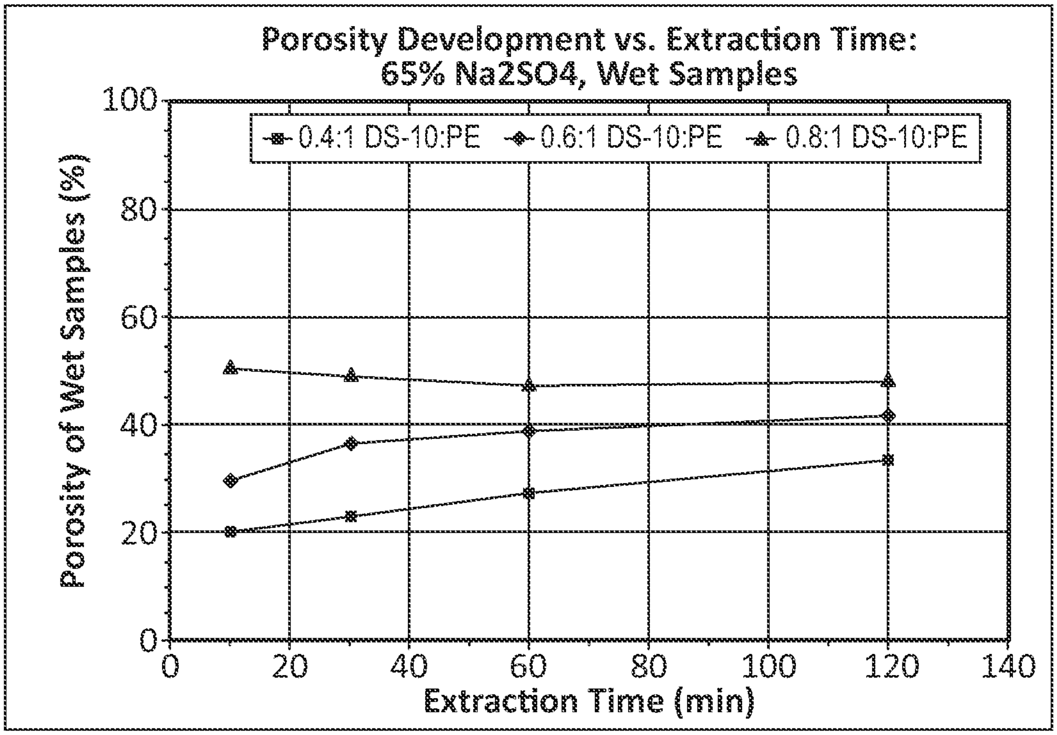
FIG. 14 is a graph showing the evolution of porosity as a function of time in nonporous $Na_2SO_4$/PE sheets.

FIG. 13 plots the time required to leach the sodium sulfate from the nonporous $Na_2SO_4$/PE sheet as a function of surfactant loading level. The data show that there is a critical surfactant loading level to get all of the sodium sulfate extracted within 2 hours. Alternatively, the data can be plotted to show the evolution of porosity as a function of time as shown in FIG. 14. Within a battery, it is expected that the dissolution of the sodium sulfate will occur in sulfuric acid during the 12-24 hr formation step in which temperatures >60 C are reached.

Next, the above membranes were dried in oven at 110 C after the 2 hour extraction period. The particle size and packing arrangement of the sodium sulfate can be designed so that the resultant separator has sufficient porosity and interconnectivity for low electrical (ionic resistance).

Figure 15:
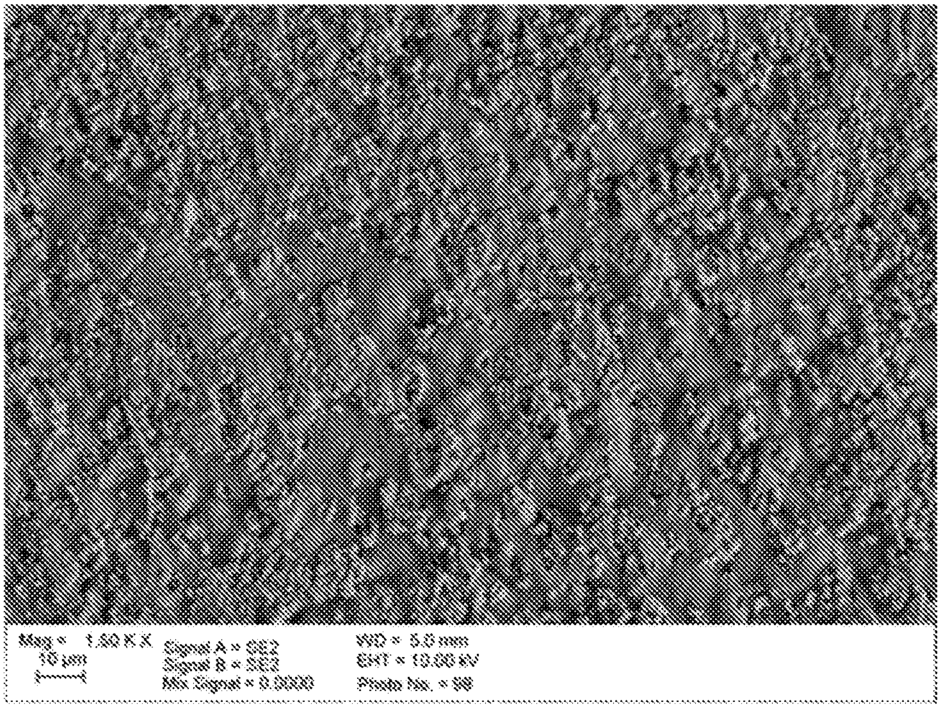
FIG. 15 is an SEM showing the surface of an extruded $Na_2SO_4$/PE sheet.
Figure 16:
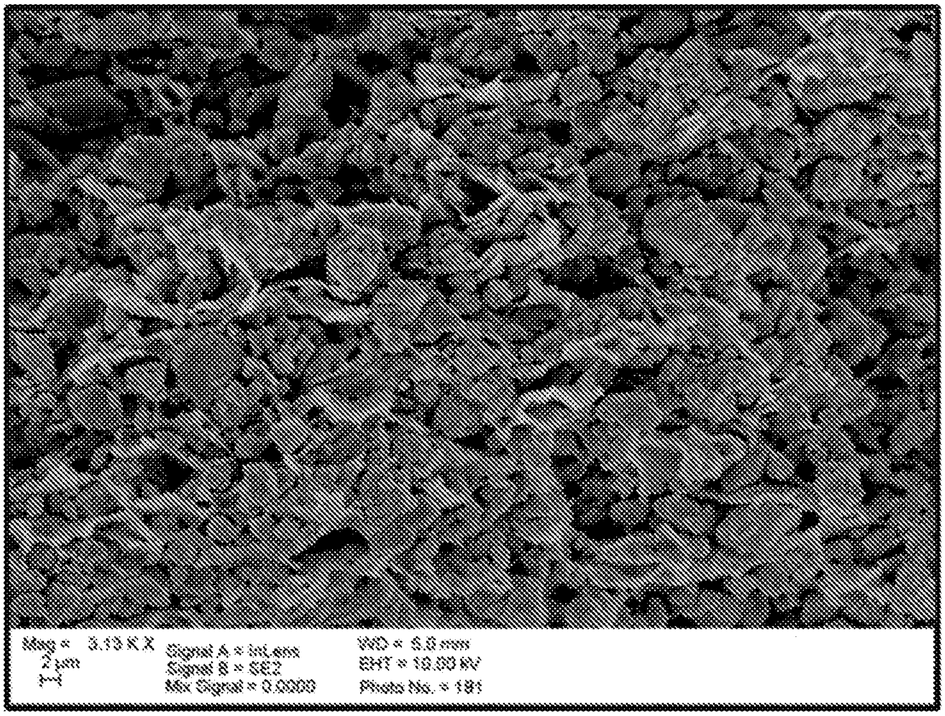
FIG. 16 is an SEM showing a cross-section view of the extruded $Na_2SO_4$/PE sheet.
Figure 17:
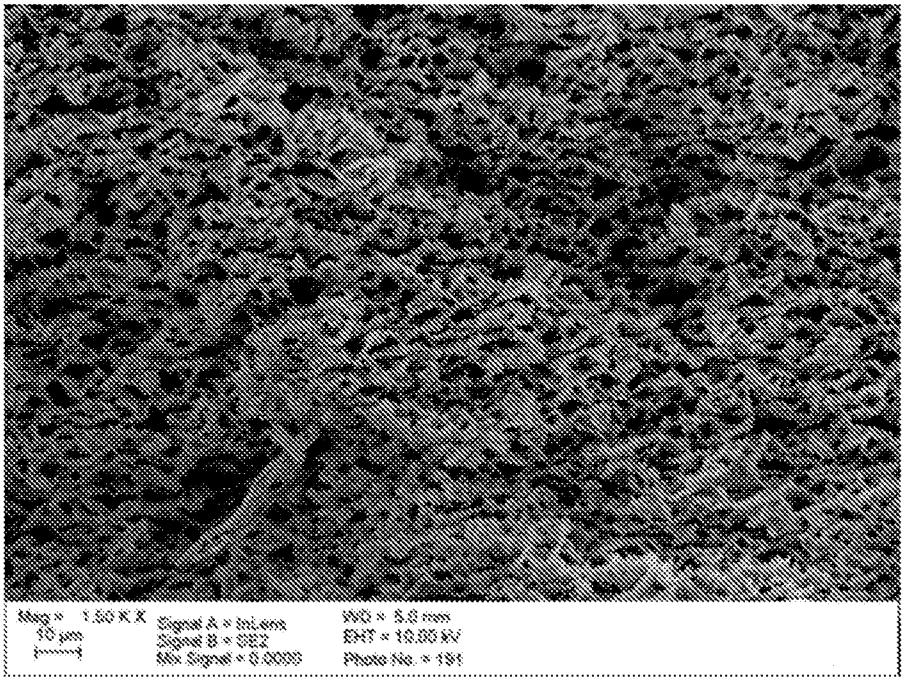
FIG. 17 is a cross-sectional view of a membrane after extraction of sodium sulfate particles.
Figure 18:
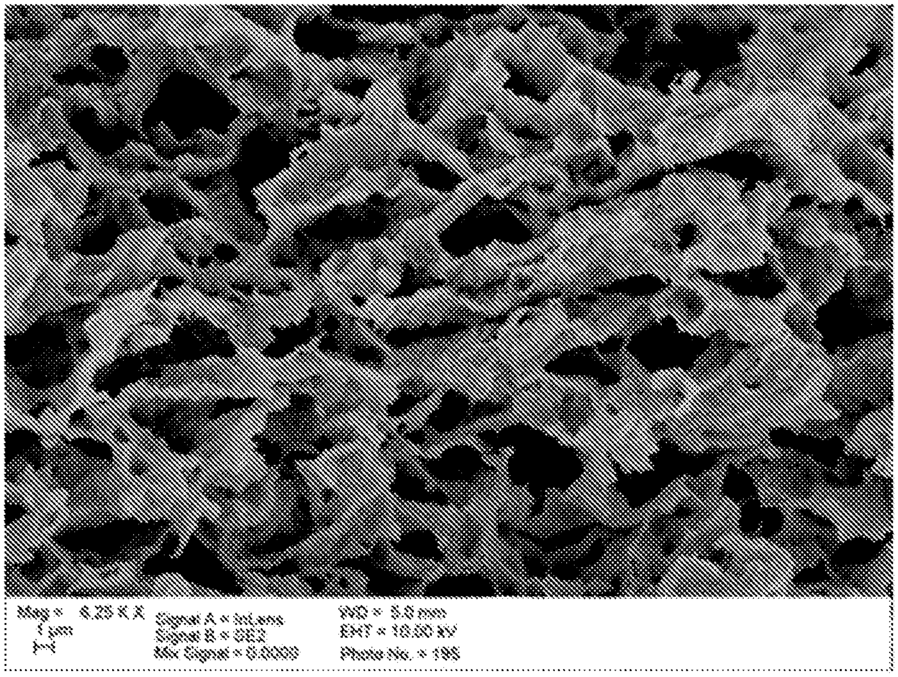
FIG. 18 is another cross-sectional view of a membrane after extraction of sodium sulfate particles.

Scanning electron microscopy was used to examine the $Na_2SO_4$/PE sheets both before and after extraction with water. FIG. 15 shows the surface of the extruded sheet while FIG. 16 shows a cross-section view in which the particle size and packing of the sodium sulfate particles is clearly revealed. FIGS. 17 and 18 show a cross-sectional view of the membrane after extraction of the sodium sulfate particles. The resultant membrane has a lacey structure of interconnected polymer sheets (or stated another way, a leafy, sponge-like structure). The tortuosity of the resultant membrane is likely higher and different from that seen with UHMWPE-based separator. Likewise, the morphology of FIGS. 17 and 18 contrast with the UHMWPE fibrils that are observed in traditional Pb-acid separators.

While porosity can be created in-situ during battery formation as a result of the dissolution of sodium sulfate from the nonporous sheets, it is also possible to stretch the extruded sheet and create some porosity through cavitation prior to introduction into the battery. Initial experiments have shown that an extruded $Na_2SO_4$/PE sheet that was stretched 2× in the machine direction resulted in: faster extraction kinetics in water at 95 C; higher porosity in the extracted membrane; lower diffusional resistance and tortuosity; and significantly lower electrical (ionic) resistance. Finally, it is possible to extrude nonporous, $Na_2SO_4$/PE sheets with ribs, but they can also be added in a downstream process.

As can be appreciated, this disclosure pertains to structures and methods of making the same. Any methods disclosed or contemplated herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

References to approximations are made throughout this specification, such as by use of the terms "substantially" and "about." For each such reference, it is to be understood that, in some embodiments, the value, feature, or characteristic may be specified without approximation. For example, where qualifiers such as "about" and "substantially" are used, these terms include within their scope the qualified words in the absence of their qualifiers.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A biaxially stretched microporous membrane, comprising:

isotactic polypropylene having a melt flow index of 0.5 to 5 g/10 min, the isotactic polypropylene forming 60-80 wt % of the microporous membrane;

an inorganic filler forming 5-25 wt % of the microporous membrane;

a surfactant forming 2-20 wt % of the microporous membrane; and a plasticizer or process oil forming 5-20 wt % of the microporous membrane, wherein the microporous membrane is formed with a stretch ratio of at least 2.0 in either a machine direction, a transverse direction, or both, and wherein the microporous membrane comprises a porosity of greater than 50%.

2. The biaxially stretched microporous membrane of claim 1, wherein the inorganic filler comprises silica.

3. The biaxially stretched microporous membrane of claim 1, comprising:

65-75 wt % isotactic polypropylene.

4. The biaxially stretched microporous membrane of claim 1, comprising:

5-15 wt % plasticizer or process oil.

5. The biaxially stretched microporous membrane of claim 1, comprising:

5-20 wt % inorganic filler.

6. The biaxially stretched microporous membrane of claim 1, wherein the microporous membrane comprises a porosity of 50-70%.

7. The biaxially stretched microporous membrane of claim 1, comprising a stretch ratio of at least 2.0 in both the machine direction and the transverse direction.

8. The biaxially stretched microporous membrane of claim 1, comprising a tortuosity of between about 1.5 and about 3.

9. The biaxially stretched microporous membrane of claim 1, comprising an electrical resistivity of less than 10,000 mΩ-cm.

10. The biaxially stretched microporous membrane of claim 1, wherein the inorganic filler comprises an inorganic oxide, carbonate, or hydroxide.

11. The biaxially stretched microporous membrane of claim 1, further comprising a plurality of ribs or surface protrusions disposed on a surface thereof.

12. The biaxially stretched microporous membrane of claim 11, wherein the plurality of ribs or surface protrusions have a height of 0.4 mm to 1.4 mm.

13. The biaxially stretched microporous membrane of claim 1, wherein a ratio of inorganic filler to isotactic polypropylene is from about 1:16 to about 1:3.

14. The biaxially stretched microporous membrane of claim 13, wherein the ratio of inorganic filler to isotactic polypropylene is from about 1:13 to about 1:7.

15. The biaxially stretched microporous membrane of claim 1, wherein the membrane has a thickness of at least 0.05 mm.

16. The biaxially stretched microporous membrane of claim 15, wherein the membrane has a thickness of between 0.10 to 0.50 mm.

17. The biaxially stretched microporous membrane of claim 1, further comprising a nucleating agent.

18. The biaxially stretched microporous membrane of claim 17, wherein the nucleating agent comprises quinacridone dye, aluminum salt of 6-quinazirin sulfonic acid, disodium salt o-phthalic acid, a sophthalic or terephthalic acid, N—N'-dicyclohexyl 2-6-naphthalene dicarboximide, or a blend of organic dibasic acid plus oxide, hydroxide, or acid of a Group II metal.

19. The biaxially stretched microporous membrane of claim 17, comprising: 0.2 to 4 wt % nucleating agent.

20. The biaxially stretched microporous membrane of claim 19, comprising:

65-75 wt % isotactic polypropylene;

5-20 wt % inorganic filler;

5-15 wt % plasticizer or process oil; and 2-15 wt % surfactant.

* * * * *